T. SAMPSON.
CUT-OUT PEDAL.
APPLICATION FILED MAR. 20, 1920.
1,370,489.
Patented Mar. 1, 1921.
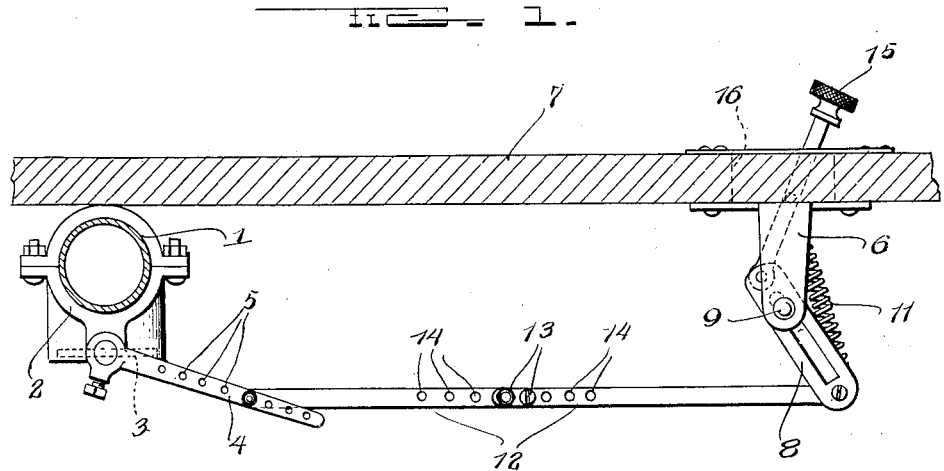
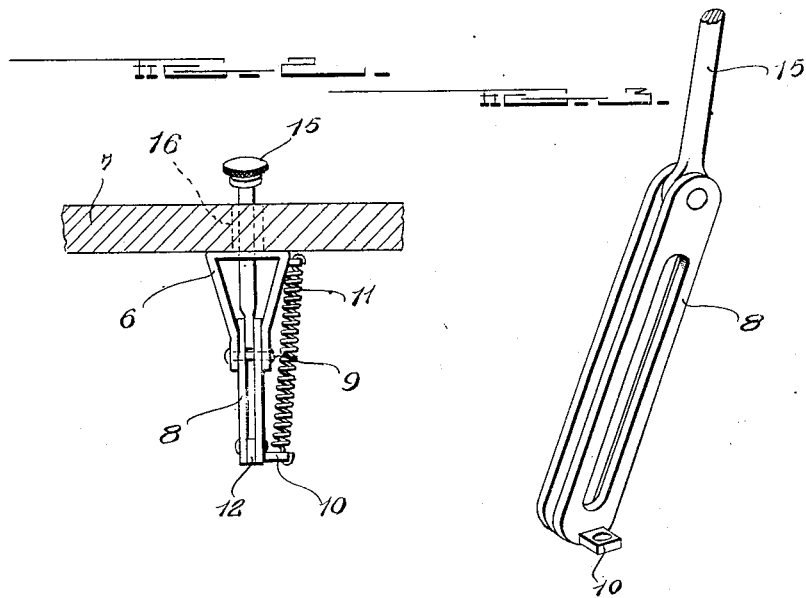
Theodore Sampson
INVENTOR
BY Victor J. Evans
ATTORNEY
WITNESS:

UNITED STATES PATENT OFFICE.

THEODORE SAMPSON, OF ALAMO, NORTH DAKOTA.

CUT-OUT PEDAL.

1,370,489.  Specification of Letters Patent.  Patented Mar. 1, 1921.

Application filed March 20, 1920. Serial No. 367,446.

*To all whom it may concern:*

Be it known that I, THEODORE SAMPSON, a citizen of the United States, residing at Alamo, in the county of Williams and State of North Dakota, have invented new and useful Improvements in Cut-Out Pedals, of which the following is a specification.

This invention relates to means for operating a cut-out for automobiles and the principal object of the invention is to provide means for rocking the cut-out valve to either open or closed position.

Another object of the invention is to provide a number of levers for connecting the pedal to the valve arm so as to do away with the use of cables or other flexible connections.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view through a portion of the floor of an automobile showing my invention in use.

Fig. 2 is an end view of the pedal and its supporting bracket.

Fig. 3 is a detail view.

In these views 1 indicates a portion of the exhaust pipe of the automobile, 2 indicates the cut-out valve casing, 3 the valve and 4 the arm connected with the valve. This arm is provided with a number of holes 5. A bracket 6 is connected with the bottom of the floor 7 of the automobile and this bracket supports a slotted lever 8 by means of the pin 9 which passes through the slot in said member. The lower end of this lever has an offset part 10 having a hole therein to receive the lower end of a coil spring 11, the upper end of this spring being connected with a portion of the bracket. As shown this spring is parallel with the slotted lever and tends to hold the lever in one or the other of its rocked positions. The lower end of the lever is connected with the arm 4 by means of the links 12, these links being adjustably connected together by the pins 13 and the holes 14. The means for rocking the lever consists of a foot pedal 15 passing through a slot 16 in the floor and having its lower end pivotally connected with the upper end of the slotted lever. This pedal is pivoted to the floor board as shown in dotted lines in Fig. 1. In this way when the pedal is moved in one direction or the other by the foot the lever will be rocked upon its pivot pin so as to open or close the cut-out valve, the spring will hold the parts in either one position or the other and after the lever is swung beyond a vertical plane the spring will tend to complete the movement of the parts.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device for controlling the movement of a cut-out valve for an automobile comprising a bracket connected with the bottom of the floor of the automobile, a slotted rocking lever, a pin connecting the lever to the bracket, said pin passing through the slot, adjustable links for connecting the lever to the valve arm, a spring connecting the lever to the bracket and holding the same in one or the other of its rocked positions and a foot pedal passing through a slot in the floor and having its lower end pivotally connected with the upper end of the lever.

In testimony whereof I affix my signature.

THEODORE SAMPSON.